US007672780B2

United States Patent
Kim

(10) Patent No.: US 7,672,780 B2
(45) Date of Patent: Mar. 2, 2010

(54) NAVIGATION SYSTEM USING RADIO FREQUENCY IDENTIFICATION SYSTEM AND METHOD FOR DISPLAYING CONSTRUCTION AREA ROAD

(75) Inventor: Tae Jin Kim, Icheon-si (KR)

(73) Assignee: Hyundai Autonet Co., Ltd., Icheon-Shi Kyungki-Do (KR)

( * ) Notice: Subject to any disclaimer, the term of this patent is extended or adjusted under 35 U.S.C. 154(b) by 693 days.

(21) Appl. No.: 11/531,065

(22) Filed: Sep. 12, 2006

(65) Prior Publication Data

US 2007/0061075 A1 Mar. 15, 2007

(30) Foreign Application Priority Data

Sep. 15, 2005 (KR) ............ 10-2005-0086303

(51) Int. Cl.
*G01C 21/30* (2006.01)
*G01C 21/32* (2006.01)

(52) U.S. Cl. .............. 701/211; 701/117; 701/200; 701/213; 701/214; 701/215; 701/216; 701/223; 340/995.1; 342/61; 342/357.06

(58) Field of Classification Search ........... 701/200, 701/211, 117, 213, 214, 215, 216, 223; 340/435, 340/447, 995.1; 342/357.06, 61, 74, 82
See application file for complete search history.

(56) References Cited

U.S. PATENT DOCUMENTS 6,049,745 A * 4/2000 Douglas et al. ............ 701/23

| 6,101,443 | A  | * | 8/2000 | Kato et al. ............. 701/210 |
| 6,282,492 | B1 | * | 8/2001 | Gorai et al. ............. 701/209 |
| 6,438,561 | B1 | * | 8/2002 | Israni et al. ............ 707/104.1 |
| 2003/0028312 | A1 | * | 2/2003 | Matsuoka et al. ........ 701/117 |
| 2003/0080901 | A1 | * | 5/2003 | Piotrowski ............. 342/386 |
| 2005/0065724 | A1 | * | 3/2005 | Lee et al. .............. 701/213 |
| 2005/0137783 | A1 | * | 6/2005 | Dort .................... 701/119 |
| 2005/0143916 | A1 | * | 6/2005 | Kim et al. ............. 701/214 |

FOREIGN PATENT DOCUMENTS

| JP | 2005-098063 | 4/2005 |
| JP | 2005-257378 | 9/2005 |
| JP | 2006-029879 | 2/2006 |
| KR | 1020050017141 | 2/2005 |

OTHER PUBLICATIONS

Hae Don Chon, Using RFID for accurate positioning, Dec. 2004, GNSS Sydney 2004, Internet,pp. 1-10.*

* cited by examiner

*Primary Examiner*—Khoi Tran
*Assistant Examiner*—Jaime Figueroa
(74) *Attorney, Agent, or Firm*—IPLA P.A.; James E. Bame

(57) ABSTRACT

Provided is a navigation system using a RFID system and a method for displaying a construction area road. The navigation system includes a RFID tag for storing construction information, and upon receipt of a predetermined command, transmitting the construction information; and a RFID reader for transmitting an information read command to the RFID tag, and receiving the construction information in response to the information read command. A bypass path is re-searched depending on the received construction information, and path guidance is performed.

3 Claims, 5 Drawing Sheets

NAVIGATION SYSTEM USING RADIO FREQUENCY IDENTIFICATION SYSTEM AND METHOD FOR DISPLAYING CONSTRUCTION AREA ROAD

CROSS REFERENCE

Applicant claims foreign priority under Paris Convention and 35 U.S.C. § 119 to a Korean Patent Application No. 10-2005-0086303, filed Sep. 15, 2005 with the Korean Intellectual Property Office.

BACKGROUND OF THE INVENTION

1. Field of the Invention

The present invention relates to a navigation system, and more particularly, to a system and method for displaying a traffic congestion road in a navigation system, for receiving information on a construction area and re-searching a bypass path bypassing the construction area, using a Radio Frequency IDentification (RFID) system.

2. Description of the Related Art

In general, a navigation system refers to a system for receiving respective position signals and absolute time signals from global positioning system (GPS) satellites, calculating a self position from the respective position signals of the GPS satellites, searching an optimal path from the calculated position to a destination inputted by the user, and performing path guidance.

Recently developed and put on a market is a navigation system including an analog or digital traffic broadcasting receiver capable of receiving a radio frequency (RF) or a digital media broadcasting, and searching a bypass path bypassing a traffic congestion area, that is, a retardation area, using the traffic broadcasting information, and guiding the searched path.

In general, the traffic information is obtained from a telephone tip provided by nationwide drivers in driving, or the construction information provided from a closed-circuit television (CCTV) or a road maintenance authority.

However, since there are many cases where traffic information on an unexpected construction area cannot be received, actual traffic information is different from received traffic information. Accordingly, the navigation system has a drawback that the driver presumes that the traffic information is different from actual traffic circumstances and thus, has a distrust of the traffic information.

In case where the traffic information has construction area information and thus the construction area is set with a bypass area, even though a construction is finished, the construction area information may remain in the traffic information. Accordingly, the navigation system has a drawback that it performs road guidance by a bypass road unnecessarily becoming more distant or more retarding.

SUMMARY OF THE INVENTION

Accordingly, the present invention is directed to a navigation system using a radio frequency identification system and a method for displaying a construction area road that substantially overcome one or more of the limitations and disadvantages of the conventional art.

One object of the present invention is to provide a system and method for displaying a traffic congestion road in a navigation system, for receiving information on a construction area and re-searching a bypass path bypassing the construction area, using a Radio Frequency IDentification (RFID) system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a navigation system using a RFID (Radio Frequency IDentification) system. The system includes a RFID tag for storing construction information, and upon receipt of a predetermined command, transmitting the construction information; and a RFID reader for transmitting an information read command to the RFID tag, and receiving the construction information in response to the information read command. A bypass path is re-searched depending on the received construction information, and path guidance is performed.

In another aspect of the present invention, there is provided a method for displaying a construction area in a navigation system using a RFID (Radio Frequency IDentification) system that has a RFID tag for storing construction information and a RFID reader connecting with the navigation system and reading and outputting the construction information to the navigation system. The method includes steps of, in the RFID reader, periodically transmitting an information read command under control of the navigation system; in the RFID tag, upon receipt of the information read command, transmitting the construction information; in the RFID reader, receiving and outputting the construction information to the navigation system; and, in the navigation system, receiving the construction information, and performing a path re-search depending on the construction information.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
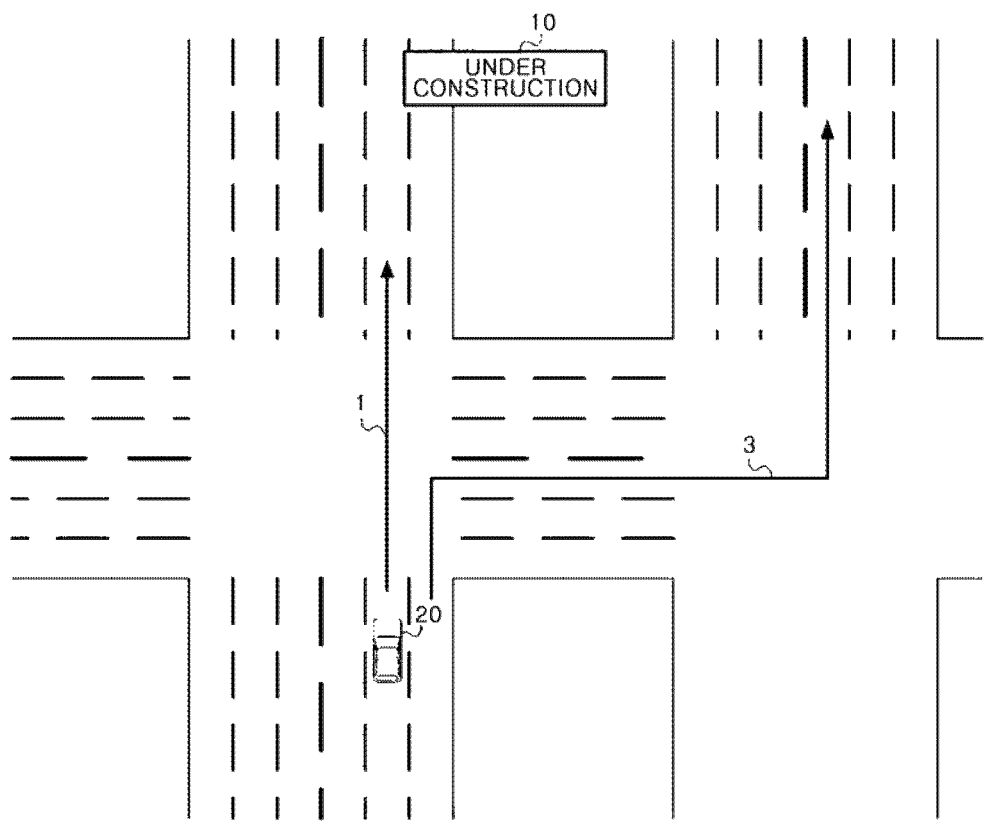
FIG. 1 illustrates a concept of displaying a construction area road in a navigation system using a radio frequency identification system according to the present invention.

Reference will now be made in detail to the preferred embodiments of the present invention, examples of which are illustrated in the accompanying drawings. Wherever possible, the same reference numerals will be used throughout the drawings to refer to the same or like parts.

In the present invention, a Radio Frequency IDentification (RFID) tag of a RFID system storing construction period, running lane, and bypass road information therein is attached to a construction signing board installed in a construction area. A RFID reader is constructed to connect within or outside a navigation system. Under the control of the navigation system, the RFID reader periodically transmits an information read command, and, upon the receipt of construction information from a RFID tag attached to an adjacent construction signing board, analyzes the construction information, and re-searches a bypass path bypassing the construction area of the construction information. According to the present invention, the RFID tag is of an active type in which it uses a self power source to increase a transmission distance of the construction information.

The navigation system using the RFID system and a method for displaying/releasing the construction area will be described with reference to accompanying drawings.

Figure 2:
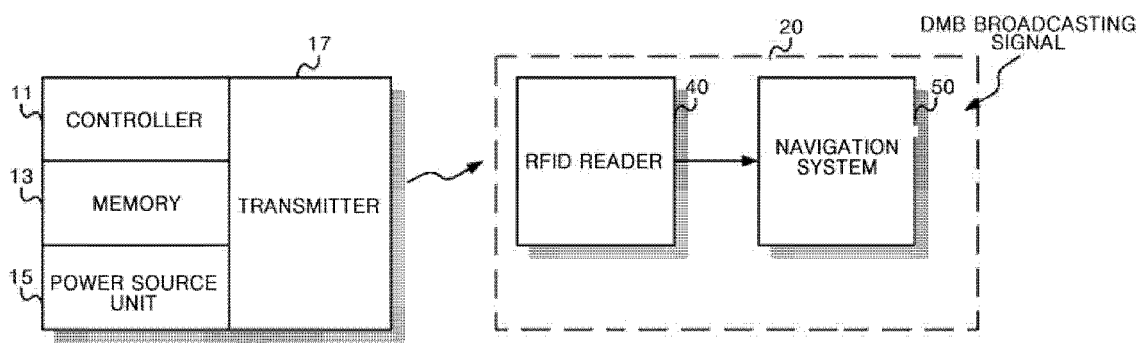
FIG. 2 illustrates a construction of a system for displaying a traffic congestion road in a navigation system using a radio frequency identification system according to the present invention.

FIG. 1 illustrates a concept of displaying a construction area road in the navigation system using the RFID system according to the present invention. FIG. 2 illustrates a construction of a system for displaying a traffic congestion road in the navigation system using the RFID system according to the present invention.

Figure 3:
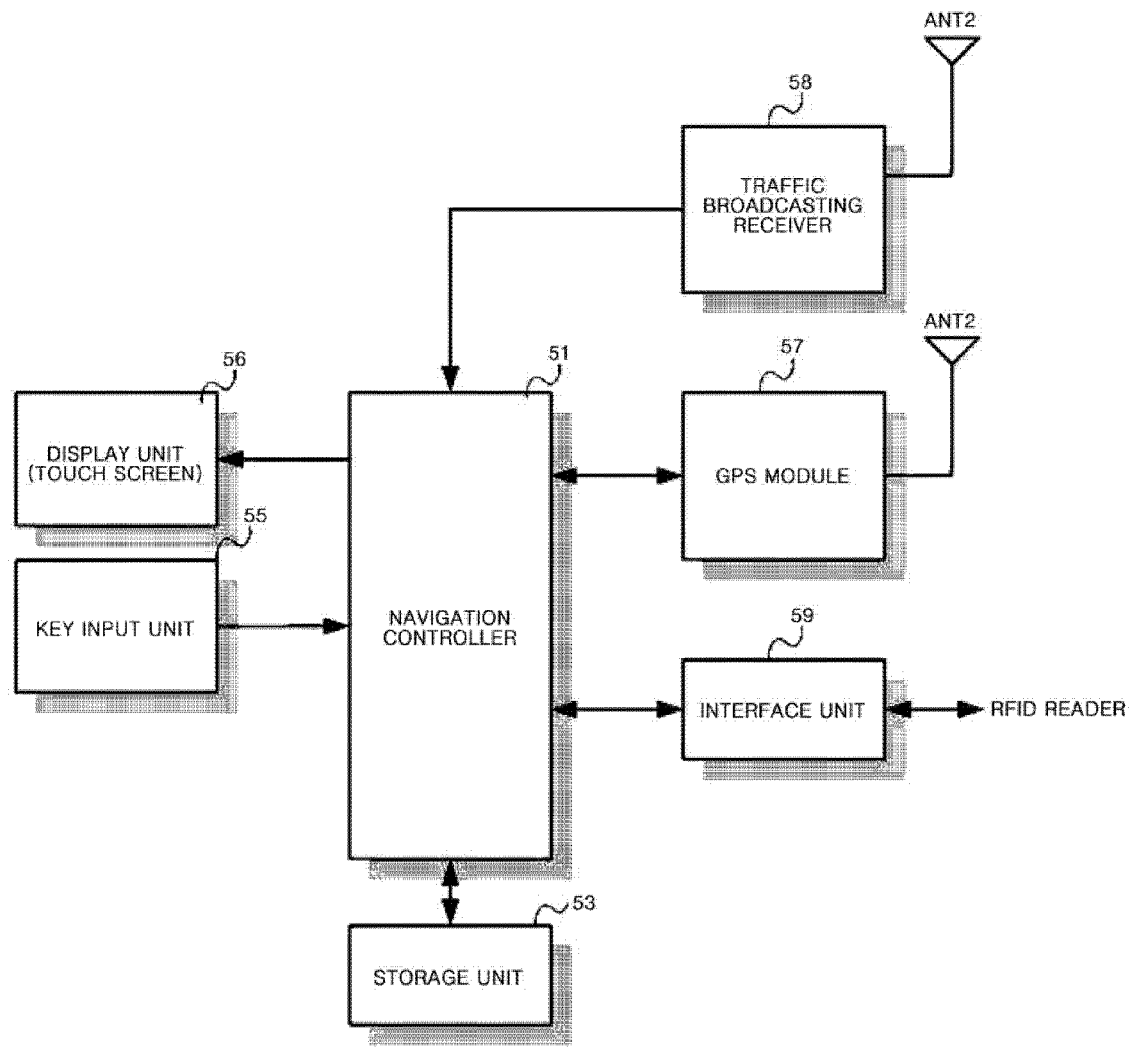
FIG. 3 illustrates a construction of the navigation system of FIG. 2.

A reference numeral 10 denotes the RFID tag, and a reference numeral 20 denotes a vehicle with the RFID reader 40 and the navigation system 50 of FIG. 3.

The RFID tag 10 includes a controller 11, a memory 13, a power source unit 15, and a transmitter 17.

The controller 111 controls a general operation of the RFID tag 10.

The memory 13 stores a control program for controlling an operation of the RFID tag 10, and the construction information.

The power source unit 15 provides a power source to the controller 11, the memory 13, and the transmitter 17.

The transmitter 17 receives the information read command from the RFID reader 40 and outputs the received read command to the controller 11 by wireless, and transmits the construction information under the control of the controller 111 by wireless. It is desirable that the transmitter 17 uses a band of about 860 MHz to 960 MHz (ISO 18000-6) for long distance recognition according to the present invention.

The inventive concept will be described with reference to FIG. 1. The navigation system 50 performs guidance along a first path (1) depending on a navigation operation. When a vehicle 20 driver drives along the first path (1) according to the guidance of the navigation system 50, the RFID reader 40 transmits the information read command under the control of the controller 50 or periodically. The RFID tag 10 adjacently positioned within a predetermined distance from the vehicle 20 having the RFID reader 40 receives the information read command, and transmits the construction information through the transmitter 17 under the control of the controller 11. The construction information includes construction site (construction area), construction period, running lane, and/or bypass road information previously stored in the memory 13, Upon the receipt of the construction information, the RFID reader 40 outputs the received construction information to the navigation system 50.

Upon the receipt of the construction information from the RFID reader 40, the navigation system 50 analyzes the received construction information, and determines whether or not the construction area is currently a search path area. When it is determined to be currently the search path area, the RFID reader 40 performs a path re-search, and guides a path by a bypass road.

A construction of the navigation system receiving the construction information, performing the path re-search, and guiding the bypass path is shown in FIG. 3.

Referring below to FIG. 3, the inventive navigation system 50 includes a navigation controller 51, a storage unit 53, a key input unit 55, a display unit 56, a GPS module 57, a traffic broadcasting receiver 58, and an interface unit 59.

The navigation controller 51 controls a general operation of the navigation system 50 according to the present invention.

The storage unit 53 includes a region for storing a control program for controlling an operation of the navigation system 50, a region for temporarily storing data generated in execution of the control program, and a region for storing traffic broadcasting information and the construction information.

The key input unit 55 includes a plurality of keys, such as a function key, a mode key, a select key, and a search key, for allowing a user to control the operation of the navigation system 50. The key input unit 55 outputs key data on the keys to the navigation controller 51.

The display unit 56 displays operation state information and map data of the navigation system 50 under the control of the navigation controller 51.

The GPS module 57 receives respective position signals and absolute time signals from a plurality of GPS satellites, calculates a self position by the respective position signals of the GPS satellites, and outputs the calculated self position to the navigation controller 51.

The traffic broadcasting receiver 58 receives the traffic broadcasting information from a digital multimedia broadcasting (DMB) station, and outputs the received traffic broadcasting information to the navigation controller 51.

The interface unit 59 provides a unit for connection with the RFID reader 40, and performs a data communication with the RFID reader 40.

The RFID reader 40 can be of a type in which it is integral with the navigation system 50.

Figure 4:
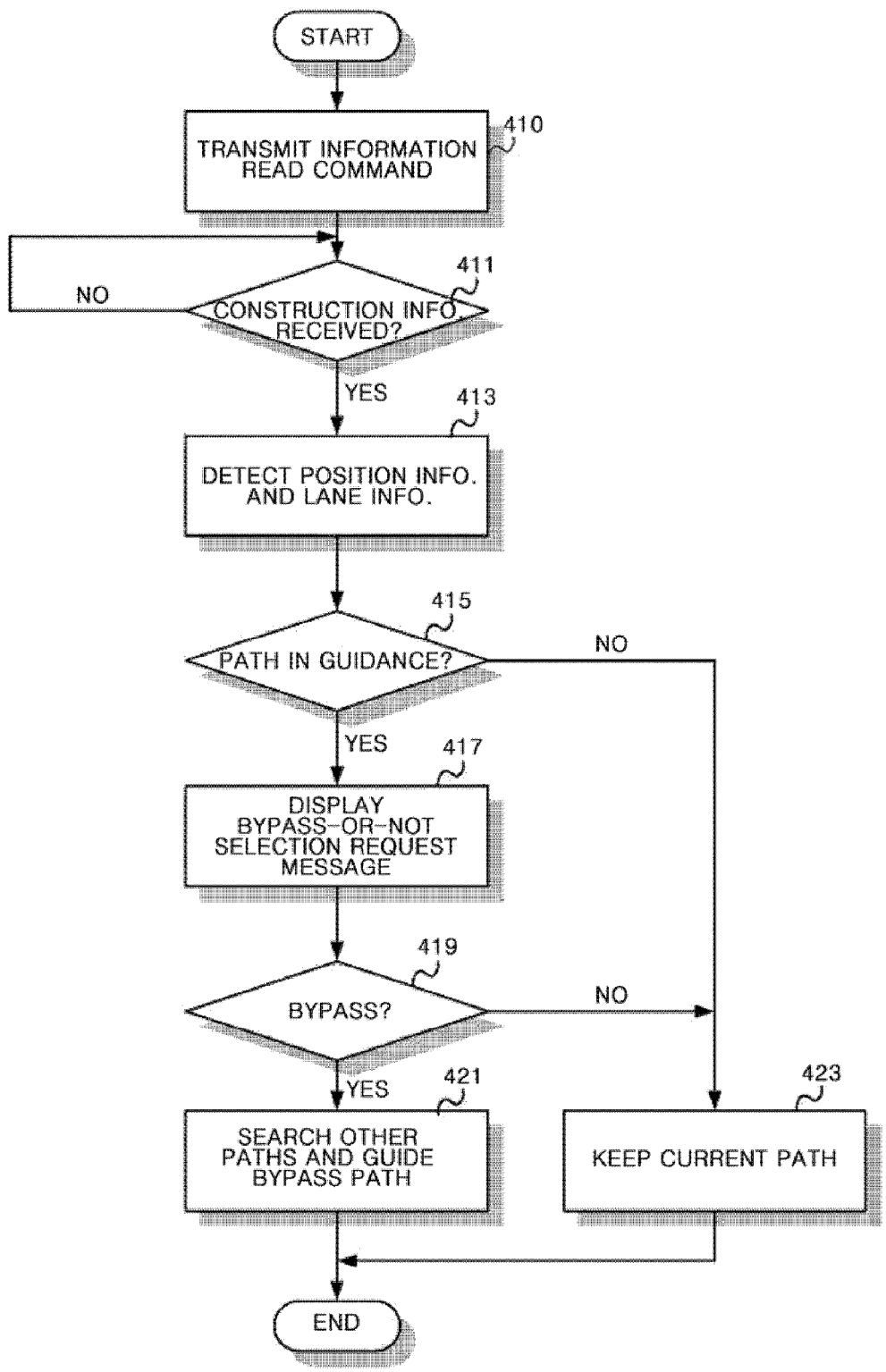
FIG. 4 is a flowchart illustrating a method for, upon the detection of a construction area, displaying a construction area road in a navigation system using a radio frequency identification system according to the present invention.

FIG. 4 is a flowchart illustrating a method for displaying the traffic congestion road in the navigation system using the radio frequency identification system according to the present invention. A description will be made with reference to FIGS. 4 to 5 below.

In Step 410, the navigation controller 51 outputs an information read control command for commanding the RFID reader 40 to transmit the information read command, to the RFID reader 40 through the interface unit 59. If so, the RFID reader 40 receives the information read control command through the interface unit 59, and transmits the information read command to the air. The RFID reader 40 can be also allowed to periodically transmit the information read command without the control of the navigation controller 51.

After the outputting of the information read control command, the navigation controller 51 proceeds with Step 411 and checks whether or not it receives the construction information from the RFID reader 40 through the interface unit 59.

Upon the receipt of the construction information of the Step 411, in Step 413, the navigation controller 51 stores the construction information in the storage unit 53, analyzes the construction information, and detects the construction site, construction area, construction period, running lane and/or bypass road information.

Upon the analyzing of the construction information, in Step 415, the navigation controller 51 determines whether or not the construction area is an area on a path in guidance.

If the determination result is that the construction area is the in-guidance path area, in Step 417, the navigation controller 51 maps the construction area to the map data, displays the mapped construction area, and displays a bypass-or-not selection request message for inquiring of the user whether or not it re-searches the bypass path bypassing the construction area, on the display unit 56.

After the Step 417, the navigation controller 51 proceeds with Step 419 and checks whether or not the bypass road is selected.

If the bypass road is not selected in the Step 419, the navigation controller 51 proceeds with Step 423 and keeps performing the path guidance by a current path. If the bypass road is selected, in Step 421, the navigation controller 51 re-searches a path other than the current path, and guides the re-searched path. When the path is re-searched, if the construction information includes the bypass road information, the navigation controller 51 re-searches a path including the bypass road of the bypass road information.

Figure 5:
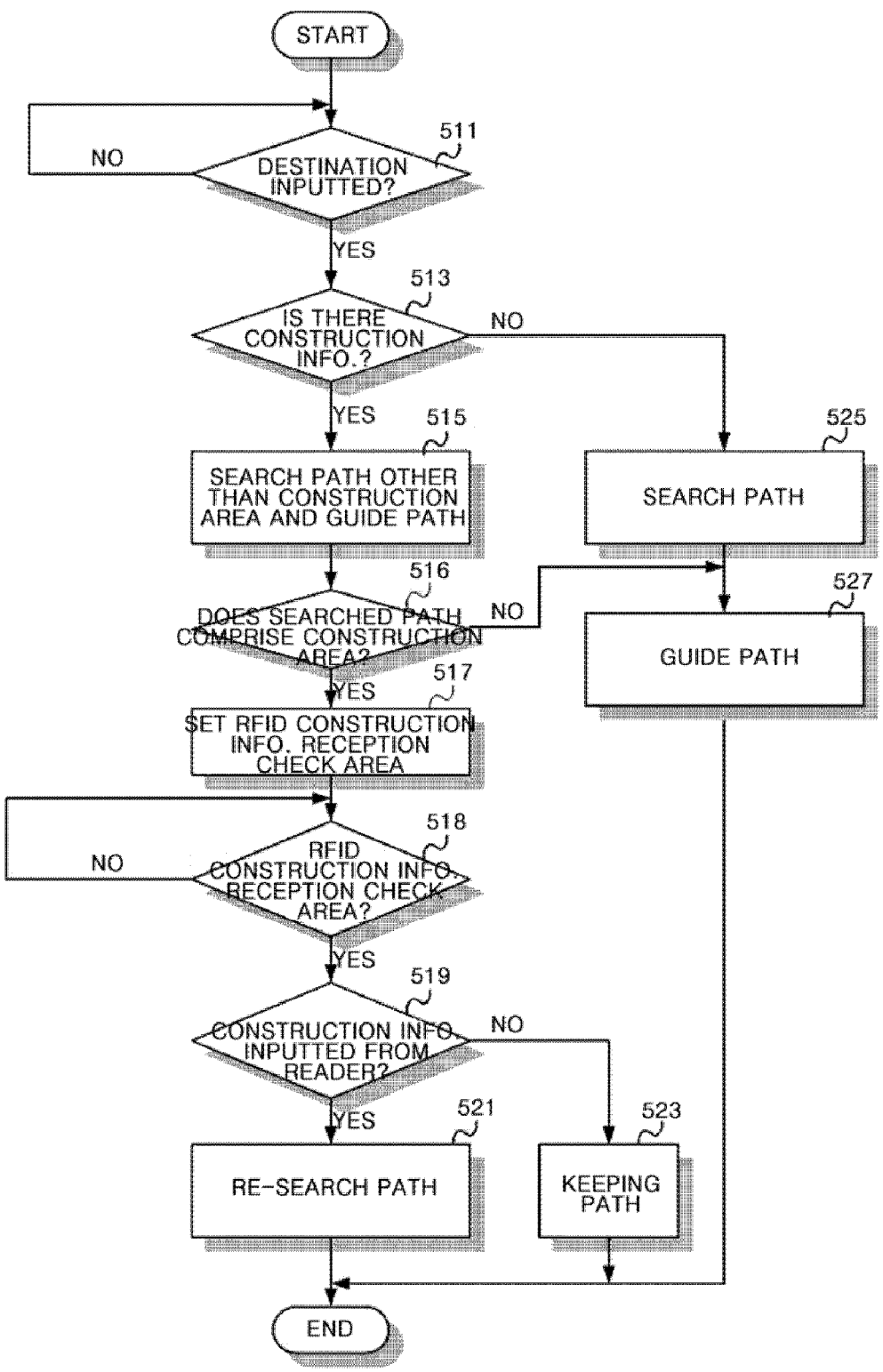
FIG. 5 is a flowchart illustrating a method for, upon the detection of a construction completion area, releasing a construction area road in a navigation system using a radio frequency identification system according to the present invention.

FIG. 5 is a flowchart illustrating a method for, upon the detection of a construction completion area, releasing the construction area road in the navigation system using the RFID system according to the present invention. A description will be made with reference to FIGS. 1 to 3 and FIG. 5 below.

In Step 511, the navigation controller 51 checks whether or not it receives a destination through the key input unit 55 or the touch screen 56.

Upon the receipt of the destination in the Step 511, the navigation system 51 proceeds with Step 513 and checks whether or not there is the construction information in the traffic broadcasting information previously stored in the storage unit 53.

If there is not the construction information in the traffic broadcasting information in the Step 513, the navigation controller 51 performs a general path search in Step 525, and performs path guidance along the searched path in Step 527. On contrary, if there is the construction information, the navigation controller 51 proceeds with Step 515 and performs a path search including the construction area.

After the execution of the path search, the navigation controller 51 proceeds with Step 516 and checks whether or not the searched path passes through the construction area of the traffic broadcasting information.

If the searched path does not pass through the construction area of the traffic broadcasting information in the Step 516, the navigation controller 51 proceeds with the Step 527 and performs the path guidance. However, if the searched path passes through the construction area in the Step 516, the navigation controller 51 proceeds with Step 517 and sets a RFID construction information reception check area. The RFID construction information reception check area is an area where the RFID reader 40 is activated to check whether or not the construction information is received from the construction area of the traffic broadcasting information.

After the Step 517, the navigation controller 51 proceeds with Step 518 and checks whether or not the self position outputted from the GPS module 57 is within the RFID construction information reception check area set in the Step 517.

If the self position is currently within the RFID construction information reception check area in the Step 518, the navigation controller 51 proceeds with Step 519 and checks whether or not it receives the construction information from the RFID reader 40.

Not receiving the RFID construction information from the RFID reader 40 until out of the RFID construction information reception check area in Step 519, the navigation controller 51 proceeds with Step 523 and keeps the current path. Receiving the RFID construction information, in Step 521, the navigation controller 51 re-searches the bypass path bypassing the construction area, and performs the path guidance.

In FIG. 5, at the time of receiving the destination and searching the path, the navigation controller 51 performs the path search without considering the construction area and then, searches the bypass path depending on whether or not it receives the RFID construction information before a predetermined distance from the construction area.

Alternately, at the time of receiving the destination and searching the path, the navigation controller 51 can search the bypass path bypassing the construction area in consideration of the construction area. When the searched path passes through the bypass path distant away by a first distance from the construction area, the navigation controller 51 checks whether or not it receives the RFID construction information from the construction area and the RFID construction information reception check area. Not receiving the RFID construction information, the navigation controller 51 re-searches the path including the construction area and guides the re-searched path. The first distance is a distance within which the RFID construction information can be received.

As described above, the inventive navigation system has an advantage that it can previously recognize the construction area and the construction completion area not informed even by the traffic broadcasting information and thus, search and guide an optimal path.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A navigation system using a RFID (Radio Frequency IDentification) system, the system comprising:
    a RFID tag for storing construction information comprising construction site, construction period, construction running lane, and bypass road information, and upon receipt of a predetermined command, transmitting the construction information, wherein the RFID tag is of an active type using a self power source to increase a transmission distance of the construction information;
    a RFID reader for transmitting an information read command to the RFID tag, and receiving the construction information in response to the information read command;
    an interface unit for performing a data communication with the RFID reader;
    a digital multimedia broadcasting receiver for receiving traffic broadcasting information;
    a GPS (global positioning system) module for receiving position signals from a plurality of GPS satellites, respectively, and calculating a self position;

a storage unit for storing map data and the traffic broadcasting information under a predetermined control;

a display unit for displaying the map data; and a controller for mapping the self position to the map data, receiving a destination inputted by a user, searching a path from the self position to the destination, mapping the searched path to the map data, displaying the mapped path on the display unit, performing path guidance along the searched path, and, upon receipt of the construction information from the RFID reader through the interface unit, re-searching the path using the bypass road information to bypass the construction site, and guiding the re-searched path, wherein upon the receipt of the construction information from the RFID reader the navigation system analyzes the received construction information and determines whether or not the construction area is currently in a search path area, wherein when it is determined to be currently in the search path area, the RFID reader performs a path re-search, and wherein when it is determined to be currently in the search path area, the controller maps the construction area on the map data, displays the mapped construction area, and displays a bypass-or-not selection request message for inquiring of the user whether or not it re-searches the path bypassing the construction area, on the display unit.

2. The system according to claim 1, wherein, in case where the traffic broadcasting information comprises the construction information and at the time of searching the path, a path search for a bypass road is performed using the construction information, whether or not the construction information is received from the RFID tag within a predetermined distance from the construction area of the construction information is checked, and, when the construction information is not received, a path re-search is performed comprising the construction area.

3. A method for displaying a construction area in a navigation system using a RFID (Radio Frequency IDentification) system that has a RFID tag for storing construction information and a RFID reader connecting with the navigation system and reading and outputting the construction information to the navigation system, the method comprising steps of:

in the RFID reader, periodically transmitting an information read command under control of the navigation system;

in the RFID tag, upon receipt of the information read command, transmitting the construction information comprising construction site, construction period, construction running lane, and bypass road information, wherein the RFID tag is of an active type using a self power source to increase a transmission distance of the construction information;

in the RFID reader, receiving and outputting the construction information to the navigation system;

in the navigation system, receiving the construction information, and performing a path re-search depending on the construction information; and in a display unit, displaying the construction area and the re-searched path in the navigation system, wherein upon the receipt of the construction information from the RFID reader the navigation system analyzes the received construction information and determines whether or not the construction area is currently in a search path area, wherein when it is determined to be currently in the search path area, the RFID reader performs a path re-search, and wherein when it is determined to be currently in the search path area, the controller maps the construction area on the map data, displays the mapped construction area, and displays a bypass-or-not selection request message for inquiring of the user whether or not it re-searches the path bypassing the construction area, on the display unit.

* * * * *